US008102576B2

(12) United States Patent
Akiyama

(10) Patent No.: US 8,102,576 B2
(45) Date of Patent: Jan. 24, 2012

(54) METHOD, APPARATUS, AND SYSTEM OF DETECTING DUPLICATED SCANNED DATA OF A DOCUMENT

(75) Inventor: Kotona Akiyama, Nakano-ku (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1334 days.

(21) Appl. No.: 11/729,894

(22) Filed: Mar. 30, 2007

(65) Prior Publication Data
US 2008/0055658 A1 Mar. 6, 2008

(30) Foreign Application Priority Data

Aug. 29, 2006 (JP) ................................. 2006-232558

(51) Int. Cl.
H04N 1/04 (2006.01)
G06K 15/00 (2006.01)
(52) U.S. Cl. ...................... 358/474; 358/1.14
(58) Field of Classification Search .................... 358/1.1, 358/1.9, 1.12, 1.13, 1.14, 1.15, 1.18, 400, 358/474; 382/100
See application file for complete search history.

(56) References Cited

U.S. PATENT DOCUMENTS

| 7,082,447 | B2* | 7/2006 | Kano | ............................ 707/661 |
| 7,450,105 | B2 | 11/2008 | Nakamura | |
| 7,515,754 | B2* | 4/2009 | Hung | ............................ 382/218 |
| 7,565,384 | B2* | 7/2009 | Kano | ................................... 1/1 |
| 7,840,034 | B2* | 11/2010 | Takahashi et al. | ........... 382/116 |
| 2004/0234169 | A1 | 11/2004 | Tojo | |
| 2005/0167342 | A1* | 8/2005 | Vullriede et al. | ............ 209/584 |

FOREIGN PATENT DOCUMENTS

| CN | 1312512 A | 9/2001 |
| CN | 1550971 A | 12/2004 |
| CN | 1584892 A | 2/2005 |
| JP | 54-84433 A | 7/1979 |
| JP | 2001-319231 A | 11/2001 |
| JP | 2005-145648 A | 6/2005 |
| JP | 2005-151127 A | 6/2005 |
| JP | 2006-164180 A | 6/2006 |
| JP | 2006-217528 A | 8/2006 |

OTHER PUBLICATIONS

Chinese Office Action dated Jun. 5, 2009.
Office Communication dated Dec. 21, 2010 issued by the Japanese Patent Office in counterpart application No. 2006-232558.

* cited by examiner

Primary Examiner — Gabriel Garcia
(74) Attorney, Agent, or Firm — Sughrue Mion, PLLC

(57) ABSTRACT

An information processing apparatus includes: a retrieval portion that retrieves feature information, which is identical to feature information obtained from a target recording medium to be processed, from a storage apparatus that stores feature information being optically readable from and being unique to each of recording media read in past times by a reading apparatus; and a control portion that controls at least one of capture and storage of an image recorded on the target recording medium in accordance with a result of the retrieval by the retrieval portion.

9 Claims, 5 Drawing Sheets

| IDENTIFIER | FEATURE INFORMATION |
|---|---|
| aaaa | (bbbb, cccc, dddd . . . ) |
| eeee | (ffff, pppp, qqqq . . . ) |
| ⋮ | ⋮ |

METHOD, APPARATUS, AND SYSTEM OF DETECTING DUPLICATED SCANNED DATA OF A DOCUMENT

CROSS-REFERENCE TO RELATED APPLICATIONS

This application is based on and claims priority under 35 U.S.C. 119 from Japanese Patent Application No. 2006-232558 filed Aug. 29, 2006.

BACKGROUND

1. Technical Field

The present invention relates to an information processing apparatus, information processing method, computer readable medium, and computer data signal.

2. Related Art

In recent year, a method of reading information recorded on paper, which is currently and extensively used in companies or the like, by an optical reading-apparatus (or scanner), electronizing the read information, and managing electronized information by a document management apparatus is widely performed. It is necessary to prevent an electronic document, which has already been created by reading the information, from being read again and from being doubly registered in the document management apparatus.

SUMMARY

According to an aspect of the present invention, an information processing apparatus comprising: a retrieval portion that retrieves feature information, which is identical to feature information obtained from a target recording medium to be processed, from a storage apparatus that stores feature information being optically readable from and being unique to each of recording media read in past times by a reading apparatus; and a control portion that controls at least one of capturing and storing of an image recorded on the target recording medium in accordance with a result of the retrieval by the retrieval portion.

BRIEF DESCRIPTION OF THE DRAWINGS

An exemplary embodiment of the present invention will be described in detail based on the following figures, wherein.

DETAILED DESCRIPTION

Figure 1:
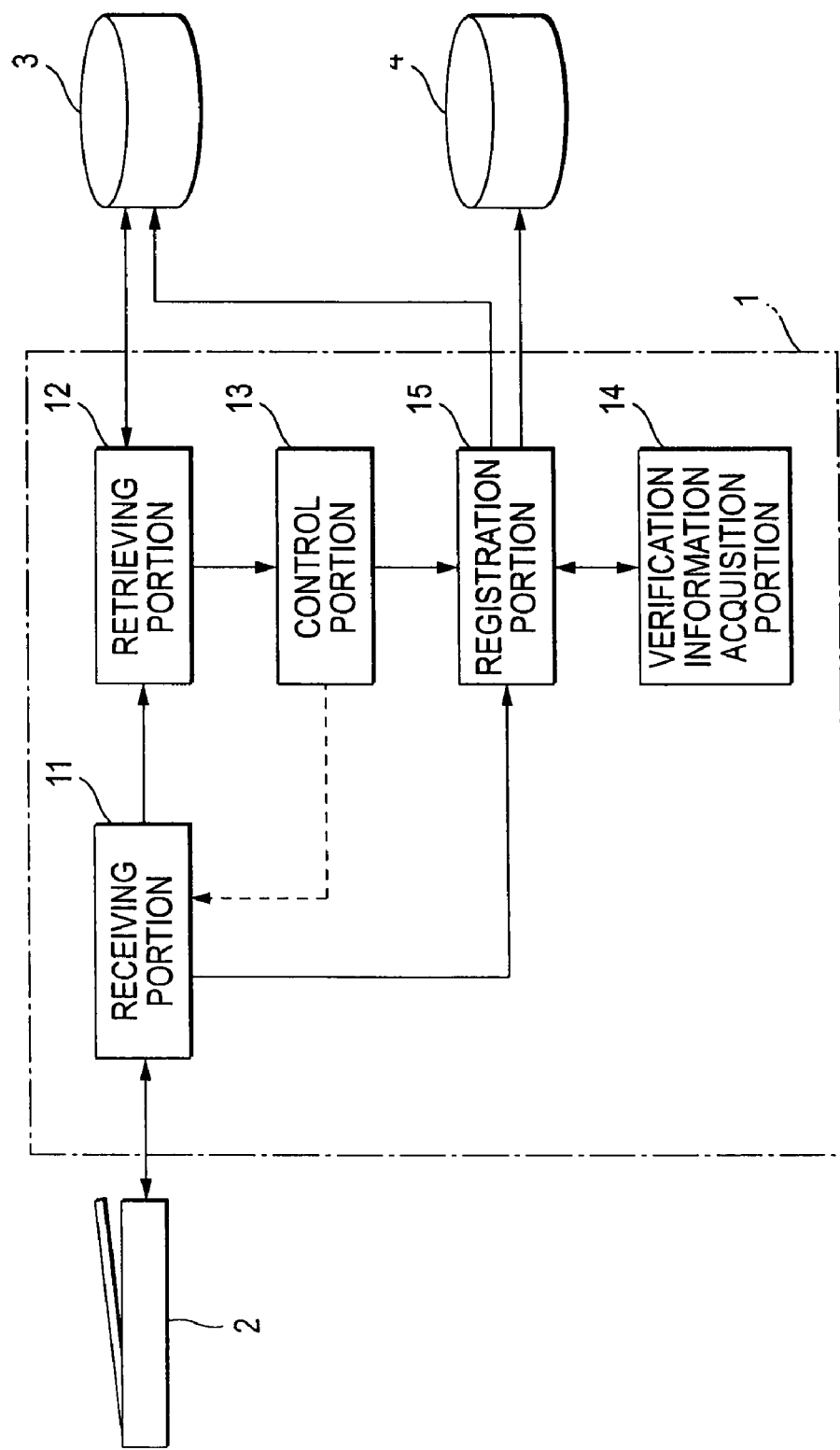
FIG. 1 is a functional block view illustrating an example of an image processing apparatus according to the invention.
Figure 2:
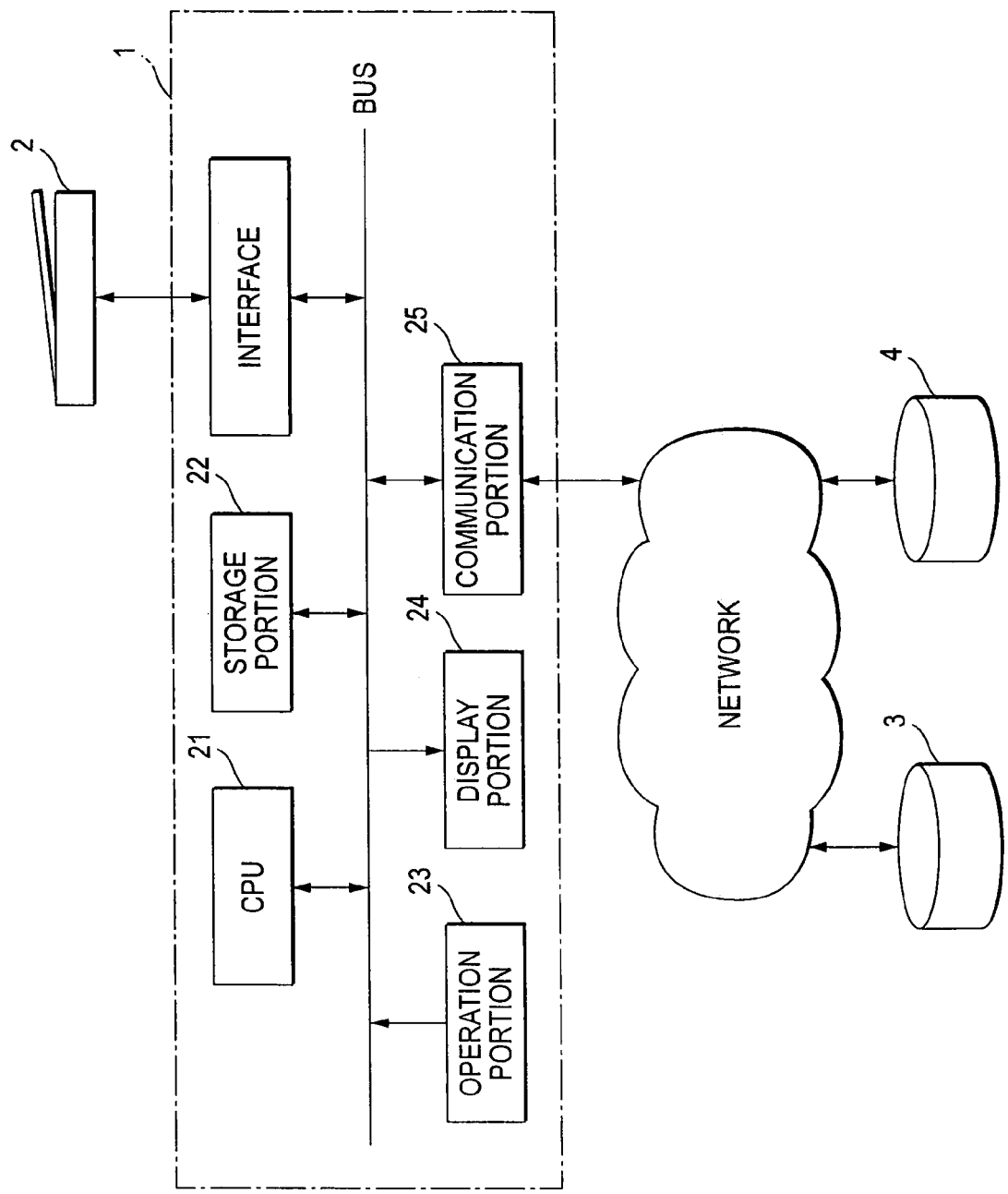
FIG. 2 is a block view illustrating the configuration of the example of the image processing apparatus according to the embodiment of the invention.

An exemplary embodiment of the invention is described below with reference to the accompanying drawings. As shown in FIG. 1, an information processing apparatus 1 according to the exemplary embodiment is connected to a reading apparatus 2, a first storage apparatus 3, and a second storage apparatus 4 through a communication circuit such as a network. The information processing apparatus 1 functionally includes a receiving portion 11, a retrieving portion 12, a control portion 13, a verification information acquisition portion 14, and a registration portion 15.

The reading apparatus 2 is, for example, a scanner which optically reads a recording medium (an original) placed on a reading surface and which outputs data representing the read image. According to an instruction input from the information processing apparatus 1, the reading apparatus 2 in the case of the present embodiment performs one of an identification image acquisition operation of reading a predetermined area of the recording medium and outputting an image of a pattern formed of the material of recording medium, and a formed image acquisition operation of reading an image (for example, an image printed on the recording medium) formed on the recording medium.

For example, in a case where the recording medium is a paper medium, an image acquired in the identification image acquisition operation is an image of a random pattern, into which plant fibers that contain cellulose as a main gradient and overlap one another are naturally woven. The image of the random pattern is generally unique to each of the recording media (see, for example, JP-A-2004-102562). For example, in a case where the recording medium is shaped like a rectangle, a reading range (the predetermined area) of the identification image can be determined as an area whose boundary is shifted by a predetermined distance from one of the corner portions of the recording medium.

The first storage apparatus 3 is, for example, a database, and stores feature information that is unique to each of the recording media read in past times by the reading apparatus 2 and that is linked to an associated one of identifiers respectively identifying the recording media. The feature information is generated according to an identification image obtained by being optically read from an associated one of the recording media, and is unique to each of the recording media. When receiving a request for registration of feature information, the first storage apparatus 3 issues a unique identifier. Then, the first storage apparatus 3 stores the issued identifier and the feature information according to the request for registration by linking the issued identifier to the feature information. Also, the first storage apparatus 3 sends the issued identifier to the source of the request for registration.

Also, the second storage apparatus 4 is, for example, a database, and holds data representing an image read by the reading apparatus 2. The second storage apparatus 4 operates as, for instance, a document database.

When receiving from a user an instruction of reading an image formed on the recording medium (the target recording medium), which is placed on the reading surface of the reading apparatus 2, and registering the second storage apparatus 4, first, the receiving portion 11 first causes the reading apparatus 2 to perform the identification image acquisition operation. Then, the receiving portion 11 outputs to the retrieving portion 12 the identification image obtained by the identification image acquisition operation.

Subsequently, when receiving from the control portion 13 (to be described later) an instruction of reading the formed image, the receiving portion 11 causes the reading apparatus 2 to perform the formed image acquisition operation. Then, the reading portion 11 outputs to the registration portion 15 data (hereunder referred to as registration target data) representing the image input from the reading apparatus 2 as a result of the formed image acquisition operation.

The retrieving portion 12 generates feature information from the identification image output by the receiving portion 11, and stores the generated feature information in a work memory. Then, the retrieving portion 12 employs pieces of the generated feature information as keys, and performs predetermined correlation operations on the pieces of the feature information employed as the keys. The retrieving portion 12 retrieves the feature information (similar to the key), the correlation value of which exceeds a predetermined threshold value, from the first storage apparatus 3. Subsequently, the retrieving portion 12 outputs a result of retrieving such feature information. In a case where the feature information similar to the key is not found, the retrieving portion 12 outputs information (hereunder referred to as unregistration information) indicating that the feature information similar to the key is not present.

Incidentally, the feature information can be obtained by, for example, the following manner. That is, first, the identification image is divided into blocks of a predetermined size (M pixels high by N pixels wide). Then, the average of the density values of pixels included in each of the blocks is computed to calculate the average density value of each of the blocks. It is advisable to set information representing a vector obtained by arranging the average density values respectively corresponding to the blocks as the feature information.

In a case where the retrieving portion 12 outputs the feature information similar to that employed as the key according to a result of retrieving (that is, the retrieving portion 12 outputs the information other than the unregistration information), the control portion 13 determines that an image formed on the same recording medium has been read in past times. Thus, the control portion 13 controls the reading apparatus 2 not to read an image formed on a target recording medium that is placed on the reading surface thereof. At that time, the control portion 13 may display or output a warning, which indicates that the recording medium has been read in past times, in a display portion (not shown), such as a display device.

For example, in a case where the retrieving portion 12 outputs information other than the unregistration information as a result of retrieving, the control portion 13 does not output to the receiving portion 11 an instruction of reading an image formed on a target recording medium.

In a case where the retrieving portion 12 outputs unregistration information, the control portion 13 outputs to the receiving portion 11 an instruction of reading an image formed on the target recording medium.

The verification information acquisition portion 14 calculates hash values of verification object information representing an object of verification according to an instruction input from the retrieving portion 15. Then, the verification information acquisition portion 14 outputs the calculated hash value to a certificate authority server (not shown) to which the verification information acquisition portion 14 is connected through a communication circuit. The verification information acquisition portion 14 outputs to the registration portion 15 information (verification information) received from the certificate authority server. Incidentally, the verification information is obtained by encrypting a value, which is obtained by adding, for example, time-and-date information (what is called timestamp information) obtained at the certificate authority server to the hash value, using a private key at the side of the certificate authority server. Such verification information is also used as information certifying a time and date.

When receiving registration object data input from the receiving portion 11, the registration portion 15 sends the feature information, which is stored in the work memory, and a registration request to the first storage apparatus 3. The registration portion 15 receives an identifier issued by the first storage apparatus 3 in response to the registration request. The registration portion 15 generates verification object information including the registration object data and the identifier. Then, the registration portion 15 outputs the generated verification object information to the verification information acquisition portion 14. Thus, the registration portion 15 causes the verification information acquisition portion 14 to acquire the verification information. When receiving the verification information input from the verification information acquisition portion 14, the registration portion 15 links the registration object data to the verification information and sends the registration object data and the verification information to the second storage apparatus 4. Thus, the registration object data and the verification information are registered in the second storage apparatus 4.

The information processing apparatus 1 is implemented by software executed by a general computer including a CPU 21, a storage portion 22, an operating portion 23, a display portion 24, and a communication portion 25. The CPU 21 operates according to the program stored in the storage portion 22, and performs processing as the constituent elements shown in FIG. 1. Incidentally, the program may be distributed by being stored in a computer-readable recording medium, for example, a CD-ROM. In this case, the program read from such a recording medium is stored in the storage portion 22 and is then executed by the CPU 21.

The storage portion 22 may include memory elements such as a ROM (Read Only Memory) and a RAM (Random Access Memory). The storage portion 22 holds programs executed by the CPU 21. The storage portion 22 operates also as a work memory for the CPU 21.

The operating portion 23 includes a mouse and a keyboard, and accepts instructions issued from and operations performed by a user and outputs signals to the CPU 21. A user issues an instruction of registering an image formed on a recording medium through, for example, the operating portion 23. The display portion 24 includes a display device and indicates information according to instructions input from the CPU 21. The communication portion 25 includes, for example, a network interface, and sends registration requests and various data through a communication circuit according to instructions input from the CPU 21. The communication portion 25 also outputs various data, such as identifiers, received through the communication circuit to the CPU 21.

Figures 3, 4:
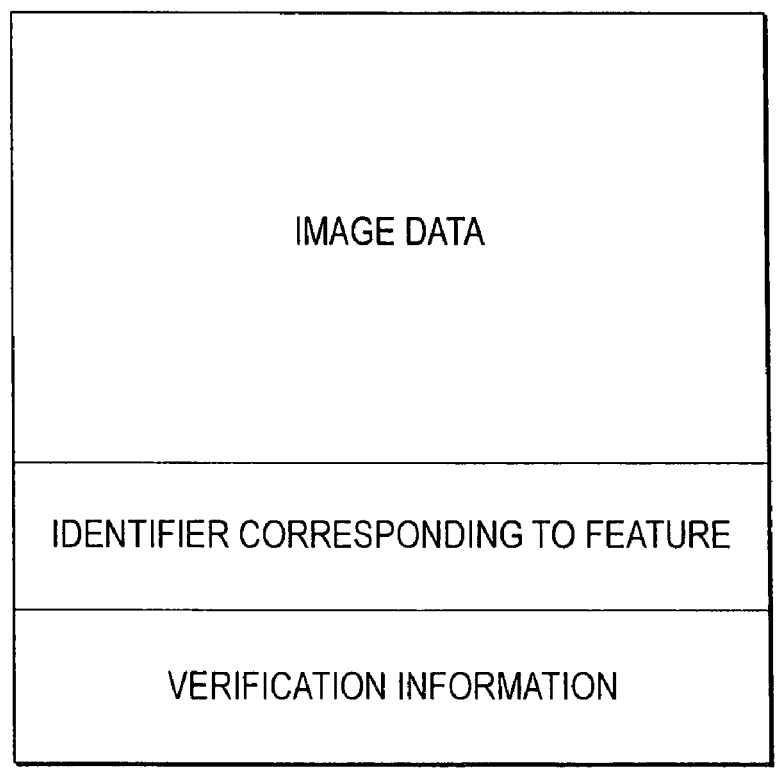
FIG. 3 is an explanatory view illustrating an example of information stored in a first storage apparatus according to the invention of the invention.
FIG. 4 is an explanatory view illustrating an example of information stored in a second storage apparatus according to the invention of the invention.

According to the information processing apparatus 1 of the present embodiment, as shown in FIG. 3, feature information unique to the recording medium read in past times by the reading apparatus 2 are stored in the first storage apparatus 3 by being linked to an associated one of different identifiers. Also, image data representing an image formed on the recording medium read by the reading apparatus 2 is stored in the second storage apparatus 4. As shown in FIG. 4, this image data is linked to information (such as an identifier) identifying feature information unique to the recording medium, on which the image is formed, and is also linked to verification information certifying the contents thereof and the time-and-date of verification thereof. That is, the verification information is decrypted using a public key of the certificate authority server to thereby obtain an initial hash value and information representing the time-and-date of verification. Thus, in a case where data representing registered object images formed on recording media read in past times is tampered at a later date, a hash value based on the tampered image changes from the initial hash value. Consequently, the apparatus can detect at least whether the data representing the image is tampered.

Figure 5:
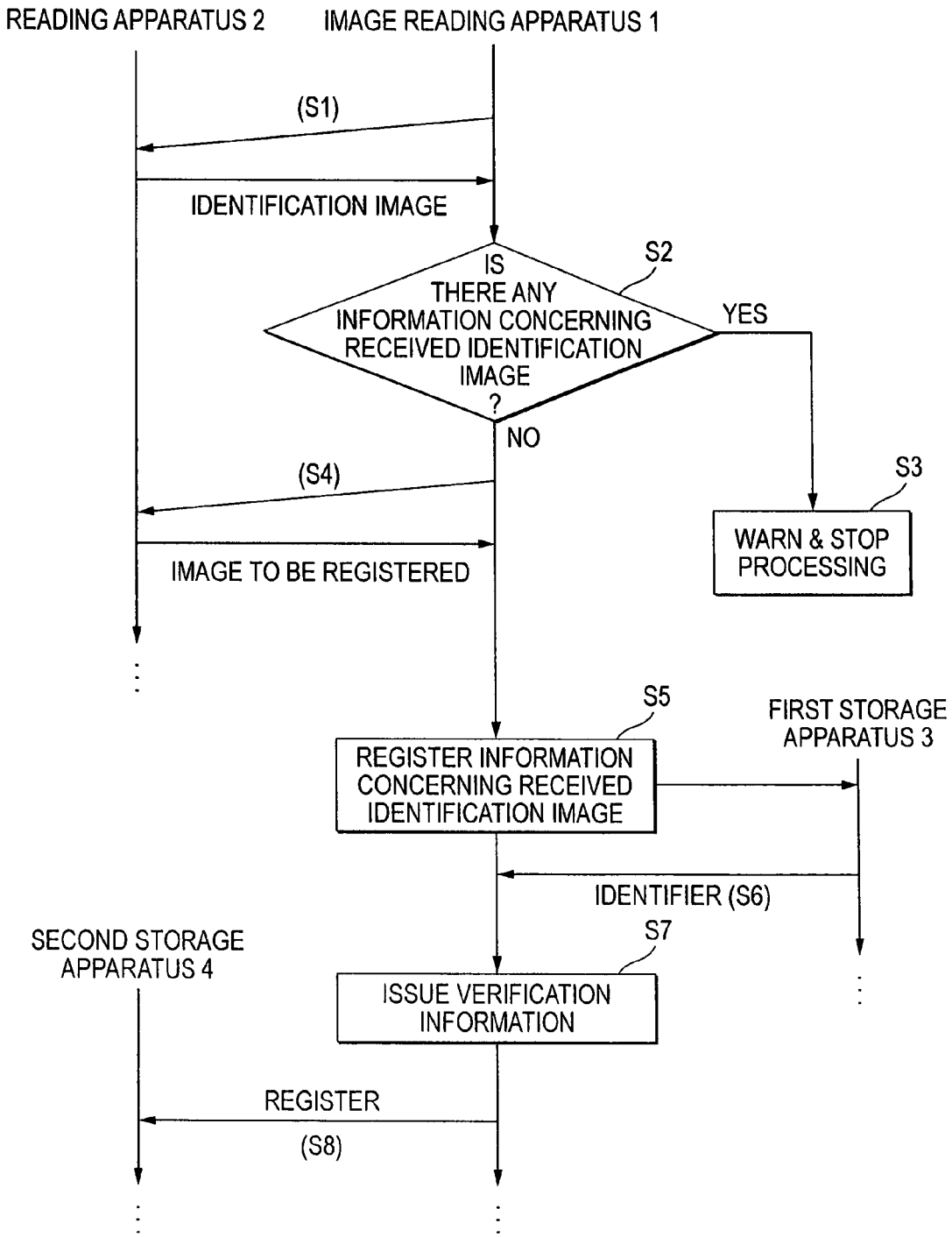
FIG. 5 is a flowchart illustrating an example of an operation the image processing apparatus according to the embodiment of the invention.

That is, when receiving an instruction of reading an original, the information processing apparatus 1 of the present embodiment causes the reading apparatus 2 to read an identification image unique to a recording medium, on which the original is recorded, in step S1, as shown in FIG. 5. Then, the information processing apparatus 1 checks in step S2 whether feature information generated from this identification image is already registered in the first storage apparatus 3. In a case where the feature information has already been registered (that is, the original has been read in past times), for example, a warning is output to the display portion 24. Thus, the processing is finished in step S3.

Conversely, if it is found in step S2 that the generated feature information is not registered in the first storage apparatus 3 (that is, the original has not been read in past times), in step S4, the information processing apparatus 1 causes the reading apparatus 2 to read an image (a registration object image) formed on the original. Also, in step S5, feature information generated from the identification image is registered in the first storage apparatus 3. Then, the first storage apparatus 3 issues an identifier unique to the feature information and sends the issued identifier to the information processing apparatus 1 in step S6.

The information processing apparatus 1 generates a hash value based on the received identifier and the registration object image read in step S4. Then, the information processing apparatus 1 sends the generated hash value to the certificate authority server. Also, in the information processing apparatus 1, verification information including timestamp information is issued corresponding to the hash value in step S7. The information processing apparatus 1 adds the verification information to information representing the registration object image, and also causes the second storage apparatus 4 to register the information representing the registration object image, to which the verification information is added, in step S8.

Therefore, in a case where a user tries to register the original, which has been registered in past times, in past times, a warning message is displayed. The reading of the original is not performed.

It has been described hereinabove that the reading apparatus 2 performs one of the identification image acquisition operation of reading the identification image, and the formed image acquisition operation of reading the registration object image formed on the recording medium. However, when reading the registration object image formed on the recording medium, the reading apparatus 2 may capture the identification image together with the registration object image. In this case, the registration object image is held in the work memory. Also, in a case where the feature information generated according to the identification image has already been registered in the first storage apparatus 3 (that is, the original has already been read in past times), the apparatus 1 may be adapted so that the registration object image is deleted from the work memory. Also, in this case, when the feature information generated according to the identification image is not registered in the first storage apparatus 3, this feature information is registered in the first storage apparatus 3. Additionally, the registration object image stored in the work memory is registered in the second storage apparatus 4.

Figure 6:
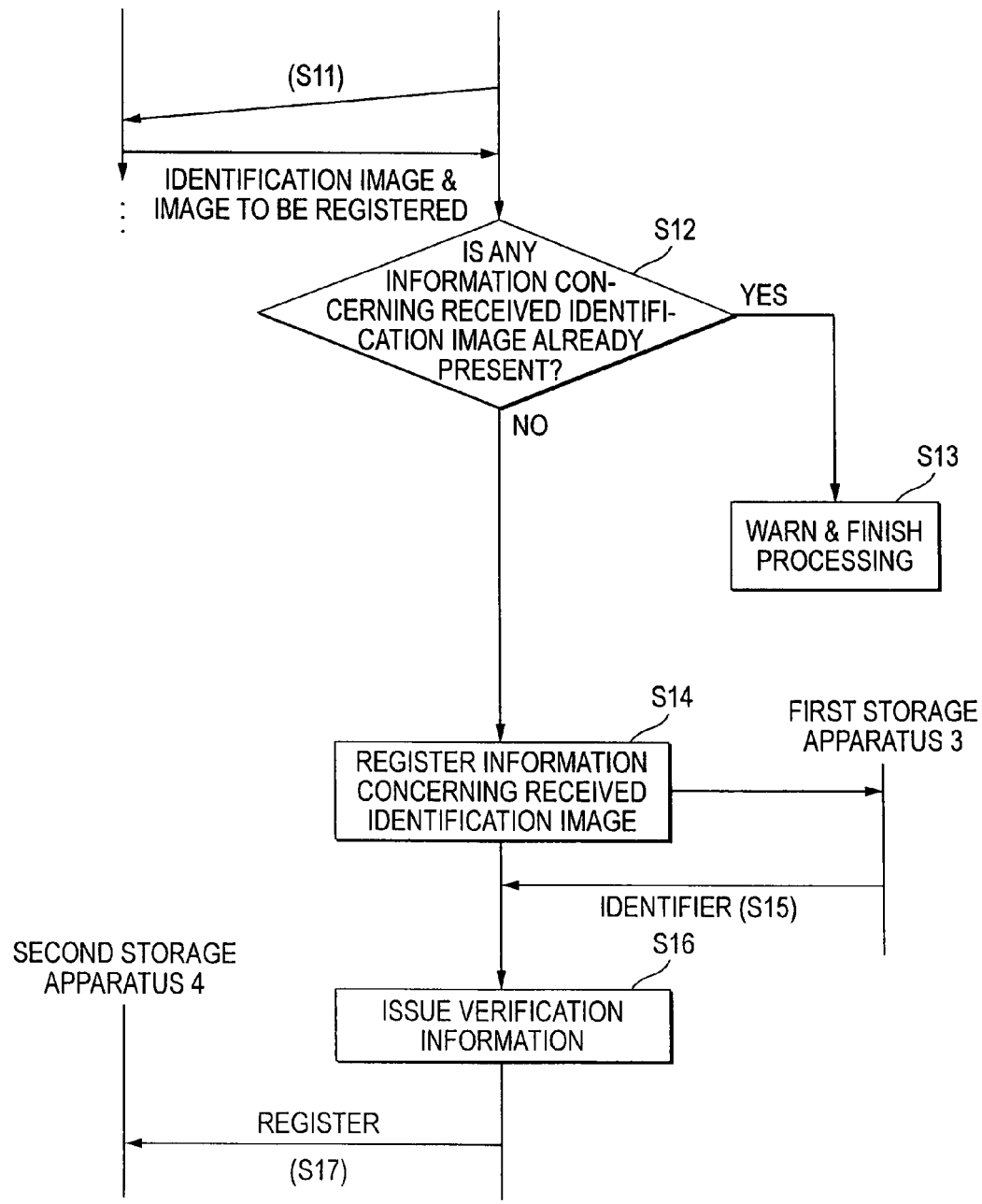
FIG. 6 is a flowchart illustrating another example of the operation the image processing apparatus according to the embodiment of the invention.

That is, an alternative example of an operation of the information processing apparatus 1 according to the exemplary embodiment is performed as follows. As shown in FIG. 6, when receiving an instruction of reading the original, the information processing apparatus 1 causes the reading apparatus 2 to read the registration object image together with the identification image unique to the recording medium, on which the original is recorded, in step S11. This registration object image is held in the work memory of the storage portion 22.

The information processing 1 checks in step S12 whether the feature information generated from the identification image has already been registered in the first storage apparatus 3. In a case where this feature information is already registered therein (that is, the original has already been read in past times), a warning message is output to, for example, the display portion 24. Then, the processing is finished in step S13. At that time, the registration object image held in the work memory may be deleted therefrom. Consequently, the storage apparatus is controlled not to register (or store) the image recorded on the target recording medium.

Conversely, if it is found in step S12 that the generated feature information is not registered in the first storage apparatus 3 (that is, the original has not been read in past times), in step S14, the feature information generated from the identification image is registered in the first storage apparatus. At that time, the first storage apparatus 3 issues an identifier unique to the feature information and sends the issued identifier to the information processing apparatus 1 in step S15.

The information processing apparatus 1 generates a hash value based on the received identifier and the registration object image held in the work memory. Then, the information processing apparatus 1 sends the generated hash value to the certificate authority server. Also, in the information processing apparatus 1, verification information including timestamp information is issued corresponding to the hash value in step S16. The information processing apparatus 1 adds the verification information to information representing the registration object image, and also causes the second storage apparatus 4 to register (or store) the information representing the registration object image, to which the verification information is added, in step S17.

The second storage apparatus 4 in the case of the present embodiment may be, for example, a server apparatus operating as a document management system or as a file server, and a personal computer personally used. That is, the second storage apparatus 4 may be separated from the first storage apparatus 3.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. An information processing apparatus comprising:
a retrieval portion that retrieves feature information, which is identical to feature information obtained from a target recording medium to be processed, from a first storage apparatus that stores feature information being optically readable from and being unique to each of recording media read in past times by a reading apparatus and verification information from a second storage apparatus that stores information identifying the feature information and the verification information including a hash value corresponding to the image read from each of the recording medium;
a control portion that controls at least one of capturing and storing of an image recorded on the target recording medium in accordance with a result of the retrieval by the retrieval portion; and
a detecting unit that obtains the hash value obtained from the verification information related to the information identifying the feature information and detects whether the image on the recording medium is tampered based on the obtained hash value.

2. The information processing apparatus as claimed in claim 1, wherein the feature information comprises a surface condition of the target recording medium.

3. The information processing apparatus as claimed in claim 1, wherein the feature information comprises a fiber pattern read from the recording medium.

4. The information processing apparatus as claimed in claim 1, wherein in a case where the result of the retrieval shows that the feature information obtained from the target recording medium is identical to the feature information stored in the storage apparatus, the control portion performs a control operation to interrupts at least one of the capturing and the storing of the image recorded on the target recording medium.

5. The information processing apparatus as claimed in claim 1, wherein in a case where the result of the retrieval shows that the feature information obtained from the target recording medium is not identical to the feature information stored in the storage apparatus, the control portion performs a control operation of capturing and storing the image recorded on the target recording medium.

6. The information processing apparatus as claimed in claim 1, which comprises:
a storing portion that stores the image recorded on the target recording medium to the storage apparatus in a case where the result of the retrieval shows that the feature information obtained from the target recording medium is not identical to the feature information stored in the storage apparatus.

7. The information processing apparatus as claimed in claim 6, which comprises:
an acquiring portion that acquires time-and-date verification information,
wherein when the image captured from the recording medium is stored, the control portion links information specifying the feature information stored in the storage apparatus to the image recorded on the recording medium, the feature information being obtained from the recording medium, and stores the information specifying the feature information stored in the storage portion by adding the time-and-date verification information to the information specifying the feature information stored in the storage apparatus.

8. An information processing method comprising:
retrieving feature information, which is identical to feature information obtained from a target recording medium to be processed, from a first storage apparatus that stores feature information being optically readable from and being unique to each of recording media read in past times by a reading apparatus and verification information from a second storage apparatus that stores information identifying the feature information and the verification information including a hash value corresponding to the image read from each of the recording medium;
controlling at least one of the capture and storage of the image recorded on the target recording medium in accordance with a result of the retrieving;
obtaining the hash value obtained from the verification information related to the information identifying the feature information; and
detecting whether the image on the recording medium is tampered based on the obtained hash value.

9. A non-transitory computer readable medium storing a program causing a computer to execute a process for controlling at least one of a capture and storage of an image recorded on a target recording medium, the process comprising:
retrieving feature information, which is identical to feature information obtained from a target recording medium to be processed, from a first storage apparatus that stores feature information being optically readable from and being unique to each of recording media read in past times by a reading apparatus and verification information from a second storage apparatus that stores information identifying the feature information and the verification information including a hash value corresponding to the image read from each of the recording medium;
controlling at least one of the capture and storage of the image recorded on the target recording medium in accordance with a result of the retrieving;
obtaining the hash value obtained from the verification information related to the information identifying the feature information; and
detecting whether the image on the recording medium is tampered based on the obtained hash value.

* * * * *